(12) United States Patent
Kishida et al.

(10) Patent No.: US 10,288,509 B2
(45) Date of Patent: May 14, 2019

(54) CAPACITIVE PRESSURE SENSOR WITH REDUCED SENSITIVITY TO TEMPERATURE CHANGE

(71) Applicant: HORIBA STEC, CO., LTD., Kyoto (JP)

(72) Inventors: Sotaro Kishida, Kyoto (JP); Takehisa Hataita, Kyoto (JP); Akira Kuwahara, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 253 days.

(21) Appl. No.: 14/892,355

(22) PCT Filed: Nov. 25, 2014

(86) PCT No.: PCT/JP2014/081104
§ 371 (c)(1),
(2) Date: Nov. 19, 2015

(87) PCT Pub. No.: WO2015/076414
PCT Pub. Date: May 28, 2015

(65) Prior Publication Data
US 2016/0169759 A1 Jun. 16, 2016

(30) Foreign Application Priority Data

Nov. 25, 2013 (JP) .................................. 2013-243381
Nov. 25, 2013 (JP) .................................. 2013-243383

(51) Int. Cl.
*G01L 9/00* (2006.01)
*G01L 19/00* (2006.01)
(Continued)

(52) U.S. Cl.
CPC ........ *G01L 9/0072* (2013.01); *G01L 19/0084* (2013.01); *G01L 19/04* (2013.01); *G01L 19/147* (2013.01)

(58) Field of Classification Search
CPC ...... G01L 9/0072; G01L 19/04; G01L 19/147
(Continued)

(56) References Cited

U.S. PATENT DOCUMENTS 3,697,835 A 10/1972 Satori
4,149,423 A * 4/1979 Zuckerwar et al. .. G01L 9/0072
73/647
(Continued)

FOREIGN PATENT DOCUMENTS

JP 2003-505688 A 2/2003
JP 5133484 B2 11/2012
(Continued)

OTHER PUBLICATIONS

Bibliographic Data for JP2003505688 A, Date: Feb. 12, 2003, Publisher: European Patent Office, pp. 1.*
(Continued)

*Primary Examiner* — Andre J Allen
(74) *Attorney, Agent, or Firm* — Greenblum & Bernstein, P.L.C.

(57) ABSTRACT

Provided is a capacitive pressure sensor that prevents the position of an electrode face in the direction parallel to a diaphragm from deviating from the position of the diaphragm, and accurately measures pressure. The capacitive pressure sensor includes: the diaphragm that deforms under pressure; an electrode member having the electrode face opposed to the diaphragm with a gap between the diaphragm and the electrode face; a body having one end to which the diaphragm is joined, and accommodating at least a portion of the electrode member; an insulating positioning member
(Continued)

that is provided in the body and positions at least the portion of the electrode member in the body; and a pressing mechanism that holds and presses the insulating positioning member or the electrode member in the direction parallel to the diaphragm.

12 Claims, 9 Drawing Sheets

(51) Int. Cl.
  *G01L 19/04* (2006.01)
  *G01L 19/14* (2006.01)
(58) Field of Classification Search
  USPC .......................................................... 73/724
  See application file for complete search history.

(56) References Cited

U.S. PATENT DOCUMENTS

| | | | | |
|---|---|---|---|---|
| 4,691,574 A | * | 9/1987 | Delatorre | G01L 9/0072 361/283.4 |
| 4,785,669 A | * | 11/1988 | Benson et al. | G01L 9/0072 73/718 |
| 4,823,603 A | * | 4/1989 | Ferran et al. | G01L 9/0072 361/283.4 |
| 5,442,962 A | * | 8/1995 | Lee | G01L 9/0072 361/283.3 |
| 6,105,436 A | * | 8/2000 | Lischer et al. | G01L 19/04 361/283.4 |
| 6,568,274 B1 | | 5/2003 | Lucas et al. | |
| 6,837,112 B2 | | 1/2005 | Ferran et al. | |
| 7,073,388 B2 | * | 7/2006 | Mei | G01L 9/0072 73/718 |

FOREIGN PATENT DOCUMENTS

| | | |
|---|---|---|
| JP | 5179752 B2 | 1/2013 |
| WO | 00/45143 A1 | 8/2000 |
| WO | 01/07883 | 2/2001 |
| WO | 01/25742 A1 | 4/2001 |
| WO | 02/14821 A2 | 2/2002 |
| WO | 2004/086457 A2 | 10/2004 |

OTHER PUBLICATIONS

Search Report issued in European Patent Office (EPO) Patent Application No. 14864736.5, dated Dec. 5, 2016, pp. 7.
International Search Report issued in PCT/JP2014/081104, dated Dec. 22, 2014, 6 pages.

* cited by examiner (a)

(b)

(c)

(a)

(b)

--PRIOR ART--

CAPACITIVE PRESSURE SENSOR WITH REDUCED SENSITIVITY TO TEMPERATURE CHANGE

TECHNICAL FIELD

The present invention relates to a capacitive pressure sensor for measuring the pressure of a fluid based on a change in capacitance between a diaphragm that deforms under pressure and an electrode member opposed to the diaphragm.

BACKGROUND ART

Patent Literature 1 and FIG. 9 show an example of a capacitive pressure sensor that is used in measuring, for example, the pressure of a gas in a semiconductor manufacturing process or other processes, and in which consideration is given to thermal deformation.

That is, a capacitive pressure sensor 100A illustrated in FIG. 9 includes a body 1A, a diaphragm 2A, an electrode member 3AA, and an insulating positioning member 4A. The body 1A is substantially cylindrical, and is made of a metal such as stainless steel. The diaphragm 2A is joined to and blocks one end of the body 1A. The electrode member 3AA has an electrode face 3SA opposed to and a predetermined gap apart from the diaphragm 2A. The insulating positioning member 4A made of a glass, ceramic, or other materials is supported by the body 1A, and positions the electrode member 3AA in the body 1A.

The insulating positioning member 4A has a shape of a substantially solid dual cylinder projecting toward the diaphragm 2A. One of the cylindrical portions of the insulating positioning member 4A is supported by a support part 11A that is ring-shaped and projects toward the inside of the body 1A. Moreover, the other cylindrical portion of the insulating positioning member 4A projects toward the diaphragm 2A, and is closer to the diaphragm 2A than the support part 11A. The electrode face 3SA, which is the end face of the other cylindrical portion, is provided near and the predetermined gap apart from the diaphragm 2A. Moreover, to keep the gap constant, the insulating positioning member 4A is pressed in the direction vertical to the diaphragm 2A.

However, in such a structure of the insulating positioning member 4A, when thermal deformation of the capacitive pressure sensor 100A occurs in response to a change in temperature, the position of the electrode face 3SA in the direction parallel to the diaphragm 2A cannot be prevented from deviating from the position of the diaphragm 2A. For instance, if the center of the electrode face 3SA does not match the center of the diaphragm 2A, the electrode face 3SA mainly refers to a place in the diaphragm 2A where deformation is less likely to occur than in the center. Thus, the electrode face 3SA detects a smaller change in capacitance than under the normal conditions. Moreover, the measurement of the capacitance is affected by, for example, a difference in the plane roughness of the diaphragm 2A between a portion referred to by the electrode face 3SA under the normal conditions and a portion referred to by the electrode face 3SA when the deviation occurred.

Thus, the deviation of the position of the electrode face 3SA in the direction parallel to the diaphragm 2A from the position of the diaphragm 2A causes a change in capacitance not due to pressure, thereby decreasing the measurement accuracy of the pressure.

There is another problem described below. In such a structure of the insulating positioning member 4A, if thermal deformation of the capacitive pressure sensor 100A occurs in response to a change in temperature, the gap between the diaphragm 2A and the electrode face 3SA significantly deviates from a predetermined value, thereby decreasing the measurement accuracy of the pressure.

The cause of the deviation will be described with a specific example in which there has been an increase in temperature in the capacitive pressure sensor 100A. In the capacitive pressure sensor 100A in FIG. 9, the other cylindrical portion of the insulating positioning member 4A projects from the same horizontal position as the position at which the insulating positioning member 4A is supported by the body 1A, toward the diaphragm 2A. The thickness of the support part 11A of the body 1A between the diaphragm 2A and the top of the support part 11A is substantially the same as that of the insulating positioning member 4A between the diaphragm 2A and the top of the support part 11A. While the support part 11A made of the metal expands with an increase in temperature, the other cylindrical portion of the insulating positioning member 4A made of the glass or ceramic hardly deforms. Thus, this increases the gap between the diaphragm 2A and the electrode face 3SA.

CITATION LIST

Patent Literature

[PTL 1] Japanese Unexamined Patent Application Publication No. 2003-505688

SUMMARY OF INVENTION

Technical Problem

In view of the above problem, the present invention provides a capacitive pressure sensor that accurately measures pressure by preventing the position of an electrode face in the direction parallel to a diaphragm from deviating from the position of the diaphragm.

Moreover, the present invention provides a capacitive pressure sensor that always accurately measures pressure by preventing a gap between the diaphragm and the electrode face from changing due to a change in temperature.

Solution to Problem

That is, a capacitive pressure sensor according to the present invention includes: a diaphragm that deforms under pressure; an electrode member having an electrode face opposed to the diaphragm with a gap between the diaphragm and the electrode face; a body having one end to which the diaphragm is joined, and accommodating at least a portion of the electrode member; an insulating positioning member that is provided in the body, and positions at least the portion of the electrode member in the body; and a pressing mechanism that holds and presses the insulating positioning member in a direction parallel to the diaphragm. Here, the expression: the direction parallel to the diaphragm is used on condition that the diaphragm is receiving balanced pressure on the top and bottom and being a flat plate, for example. The same thing can be said about the state of the diaphragm in the expression: the direction vertical to the diaphragm.

In such a capacitive pressure sensor, the pressing mechanism holds and presses the insulating positioning member or the electrode member in the direction parallel to the diaphragm. Thus, when the position in the parallel direction of the insulating positioning member deviates from the designed desired position, the insulating positioning member is pushed back to the position at which the pressing mechanism balances opposite forces in the parallel direction applied from opposite points at which the insulating positioning member is held. This can keep the electrode member, which is positioned by the insulating positioning member, at almost the same position in the parallel direction.

Accordingly, the position in the parallel direction of the electrode face can be prevented from deviating from the position of the diaphragm, and thus a portion of the diaphragm referred to by the electrode face is less likely to change. Thus, in the parallel direction, measurement can be performed always under the same conditions. This can accurately measure the capacitance, and improve the measurement accuracy of pressure.

The pressing mechanism may include a position adjuster that has a pressed surface to which a force is to be applied in a direction vertical to the diaphragm, and a contact surface that is in contact with the insulating positioning member, and with which the insulating positioning member is to be pressed in a direction oblique to the diaphragm. This allows the pressing mechanism to press the insulating positioning member or the electrode member in the vertical direction and fix it to the body while keeping the insulating positioning member at almost the same position in the parallel direction.

The contact surface may be an inclined face inclined relative to the pressed surface so that in a simple structure, the insulating positioning member or the electrode member is pressed with the position adjuster in the vertical direction and in the parallel direction.

The position adjuster may be substantially ring-shaped, and have a top surface that is the pressed surface and an inner peripheral surface that is the contact surface. Such a position adjuster allows the insulating positioning member or the electrode member to be pressed in almost all the directions in a plane parallel to the diaphragm, and the centers of the electrode face and the diaphragm continue to match.

The pressing mechanism may further include a pressing plate that is in contact with the pressed surface and screwed to the body in the direction vertical to the diaphragm. With such a pressing mechanism, the insulating positioning member is fixed and the position thereof is determined by only screwing the pressing plate in the vertical direction.

The electrode member may include: a fixed electrode fixed to the insulating positioning member, and having the electrode face; a signal extraction electrode fixed with an insulating seal sealing the other end of the body; and a flexible connection member that electrically connects the fixed electrode and the signal extraction electrode. In such an electrode member, the action that the pressing mechanism tries to move the insulating positioning member back to the original position is prevented from being hindered by resistance from the electrode member, and the centers of the electrode face and the diaphragm always match.

That is, a capacitive pressure sensor according to the present invention includes: a diaphragm that deforms under pressure; an electrode member having an electrode face opposed to the diaphragm with a gap between the diaphragm and the electrode face; a body having one end to which the diaphragm is joined, and accommodating at least a portion of the electrode member; and an insulating positioning member that is provided in the body, and positions at least the portion of the electrode member in the body. The body includes a support part that supports the insulating positioning member on the support plane a predetermined distance apart from the diaphragm toward the other end of the body. The insulating positioning member is provided on the support plane or between the support plane and the other end of the body. The electrode face and at least a portion of the electrode member are provided between the support plane and the diaphragm.

In such a capacitive pressure sensor, the insulating positioning member is not present between the diaphragm and the support plane. Only the electrode face and the electrode member, which are made of the same metal as the body, are present between the diaphragm and the support plane. Thus, (i) the body between the diaphragm and the support plane and (ii) the electrode face and the electrode member between the diaphragm and the support plane have almost the same thermal deformation volumes in the direction in which the gap exists.

That is, although the thermal deformation volume of the body changes the distance between the insulating positioning member and the diaphragm, the electrode face and the electrode member thermally deform in the direction opposite the direction in which the insulating positioning member moves. Thus, the amounts of movements of the electrode face caused by a change in temperature almost cancel out.

Accordingly, the change in temperature causes little change in the gap between the diaphragm and the electrode face. Thus, the measurement accuracy of pressure can be maintained at substantially the same level despite the change in temperature.

The electrode member may include a measurement electrode fixed to the insulating positioning member and having the electrode face; a signal extraction electrode that is fixed to the other end of the body, and extracts a signal from the measurement electrode; and a flexible connection member that electrically connects the measurement electrode and the signal extraction electrode. In such an electrode member, the following effects are obtained. The movement of the insulating positioning member due to the thermal deformation of the body moves the electrode face. However, the thermal deformations of the electrode member and the electrode face move the electrode face in the opposite direction. Thus, the amounts of the movements in the opposition directions of the electrode face cancel out, causing no change in the gap between the diaphragm and the electrode face.

The following describes a specific structure example for making the thermal deformation volume of the body between the diaphragm and the support plane be almost the same as the thermal deformation volumes of the electrode face and the electrode member between the diaphragm and the support plane. For instance, the thickness of the electrode member between the diaphragm and the end of the insulating positioning member on the side where the diaphragm is formed is set to be almost the same as a distance obtained by subtracting the gap from the distance between the diaphragm and the end of the insulating positioning member on the side where the diaphragm is formed.

The capacitive pressure sensor may further include a fixing screw mechanism that fixes the electrode member to the insulating positioning member so that the measurement electrode is accurately and easily attached to a predetermined position of the insulating positioning member.

The following describes a specific example of a structure in which the degree of projection of the measurement electrode projecting from the end of the insulating positioning member on the side where the diaphragm is formed, toward the diaphragm is set as designed, and the measurement electrode is fixed to the insulating positioning member, thereby improving the accuracy of the gap between the electrode face and the diaphragm. The measurement electrode may include (i) an opposite portion provided between the diaphragm and the end of the insulating positioning member on the side where the diaphragm is formed, and having the electrode face opposed to the diaphragm and (ii) a penetration projecting from the opposite portion and penetrating the insulating positioning member. The fixing screw mechanism may include a threaded portion formed in the penetration, and a nut screwed onto the threaded portion and holding the insulating positioning member together with the opposite portion.

Advantageous Effects of Invention

In a capacitive pressure sensor according to the present invention, the pressing mechanism that holds and presses the insulating positioning member in the direction parallel to the diaphragm can keep the insulating positioning member and the electrode member at almost the same positions in the parallel direction. Thus, the electrode face is kept opposed to the diaphragm at almost the same position in the parallel direction, thereby preventing the capacitance from changing due to factors other than pressure. Accordingly, the present invention makes it possible to accurately measure pressure based on a change in capacitance.

Moreover, in the capacitive pressure sensor according to the present invention, only the body, the electrode face, and the electrode member, which are made of metal, are present between the diaphragm and support plane. Thus, even if the thermal deformation of the body between the diaphragm and the support plane moves the insulating positioning member and the electrode member toward the gap, the electrode face and the electrode member thermally deform in the direction opposite the direction in which the insulating positioning member and the electrode member move. That is, the amounts of the movements of the electrode face cancel out. Thus, the gap between the diaphragm and the electrode face hardly changes. Accordingly, the measurement accuracy of pressure is unaffected by a change in temperature.

Figure 1:
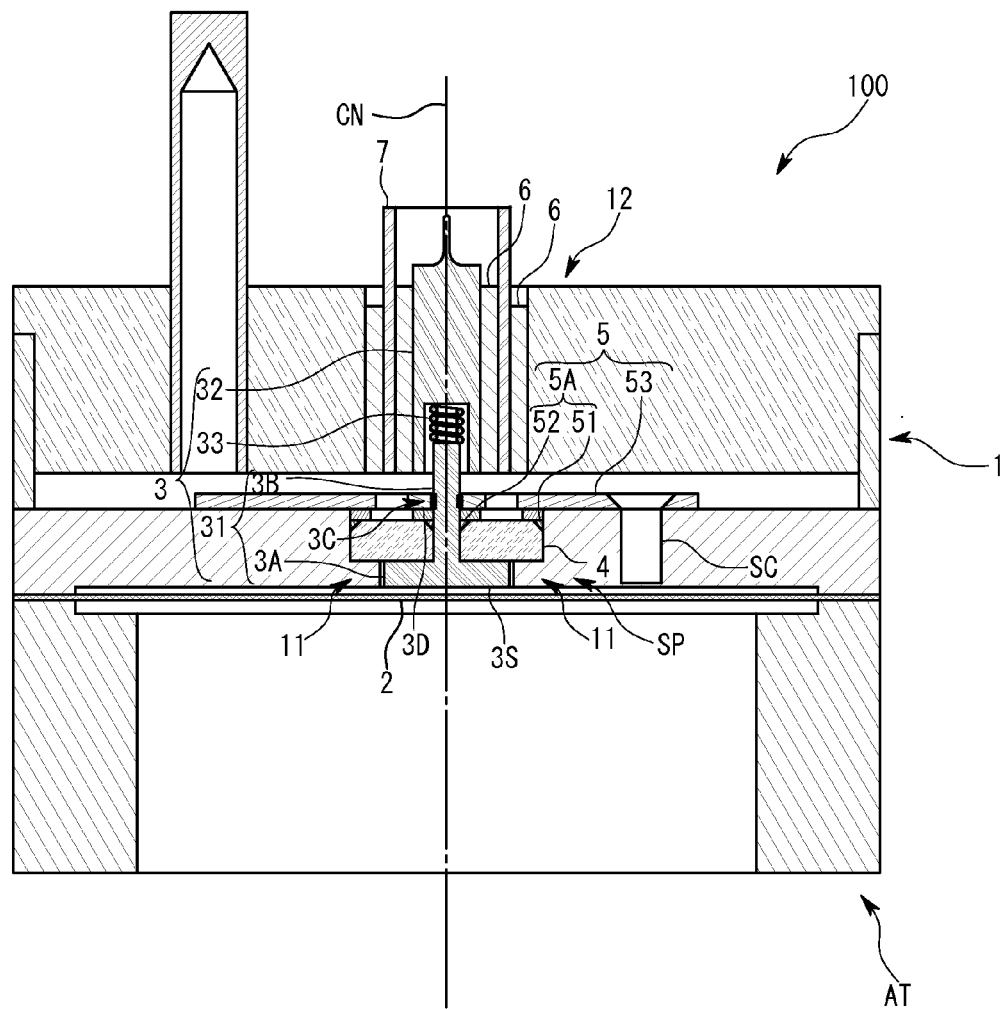
FIG. 1 schematically illustrates a cross section of a capacitive pressure sensor according to an embodiment of the present invention.

REFERENCE SIGNS LIST 100 capacitive pressure sensor
1 body
11 support part
2 diaphragm
3 electrode member
31 measurement electrode
32 signal extraction electrode
33 spring (flexible connection member)
3A opposite portion
3B penetration
3C threaded portion
3D nut
3E accommodating depressed portion
3F insertion
3S electrode face
4 insulating positioning member
41 flat surface
5 pressing mechanism
51 first ring-shaped component
52 second ring-shaped component
5A position adjuster
5P pressed surface
5C contact surface
53 pressing plate
6 insulating seal
SC fixing screw
PL support plane

DESCRIPTION OF EMBODIMENTS

With reference to FIGS. 1 to 4, a capacitive pressure sensor 100 according to an embodiment of the present invention is described below.

The capacitive pressure sensor 100 is used for measuring the pressure of a fluid in a flow control device such as a mass flow controller or a pressure control device. As FIG. 1 illustrates, the capacitive pressure sensor 100 includes a diaphragm 2 that deforms under the fluid pressure and an electrode face 3S opposed to the diaphragm 2. The capacitive pressure sensor 100 measures the pressure by a change in capacitance between the diaphragm 2 and the electrode face 3S.

Figure 2:
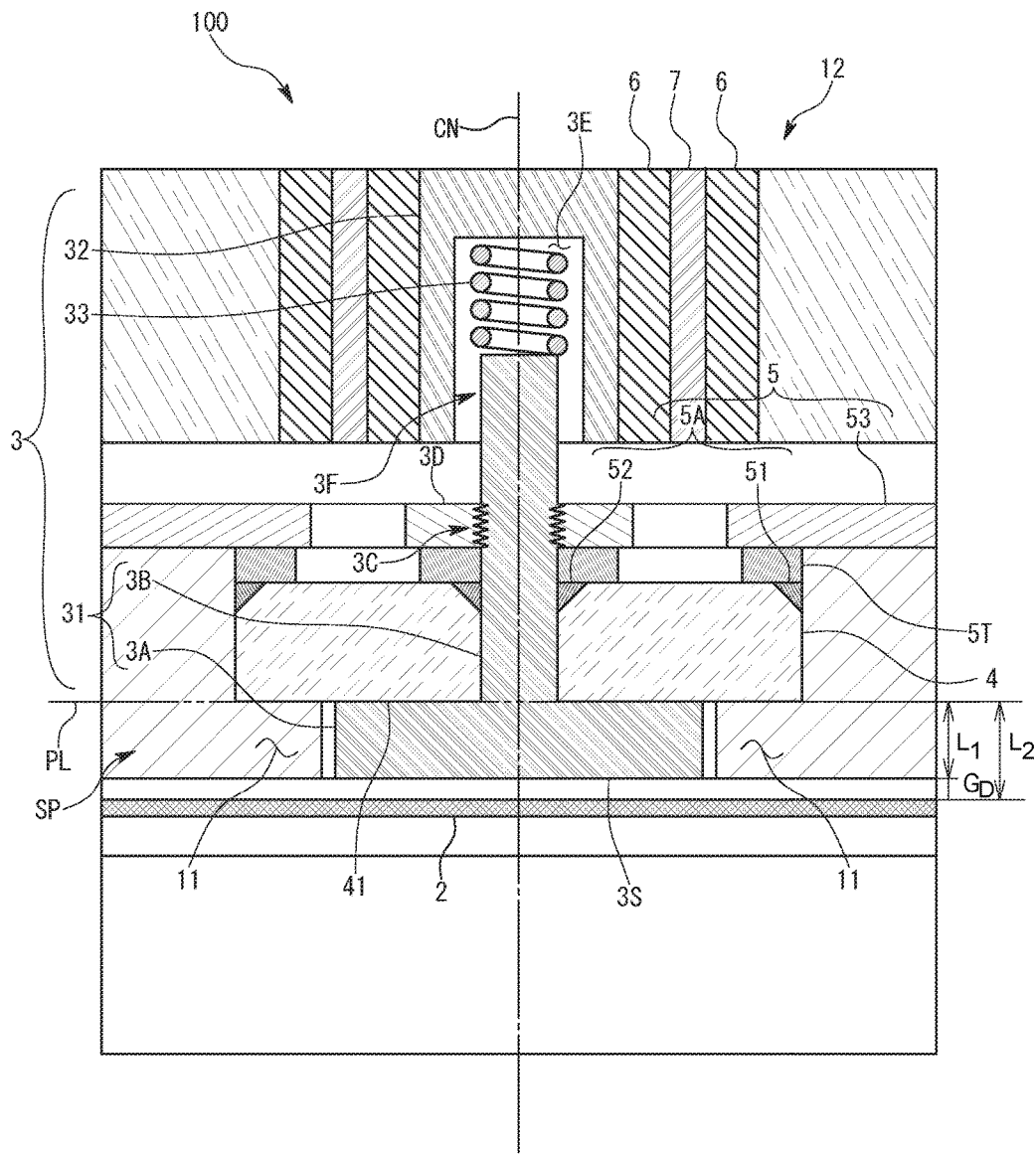
FIG. 2 schematically illustrates an enlarged cross section of a diaphragm, an electrode face, and their vicinity in the embodiment.

More specifically, as FIG. 1 illustrates, the capacitive pressure sensor 100 includes an attachment part AT that is substantially hollow cylindrical and attached to a flow path through which the fluid flows, and a body 1 provided above the attachment part AT and accommodating components. The body 1 is substantially cylindrical and made of a metal such as stainless steel. The diaphragm 2 is joined to and blocks one end of the body 1 while an opening at the other end is sealed with a lid 12. As FIGS. 1 and 2 illustrate, the body 1 accommodates a portion of an electrode member 3, an insulating positioning member 4, and a pressing mechanism 5. The electrode member 3 has the electrode face 3S. The insulating positioning member 4 positions the portion of the electrode member 3. The pressing mechanism 5 holds and presses the insulating positioning member 4 in the horizontal direction in the figures. The components accommodated in the body 1 are symmetric to a central axis CN of the body 1.

The details of the components are described below.

The electrode member 3 is made of a metal having the value of a coefficient of linear expansion close to that of the body 1, and includes a measurement electrode 31, a signal extraction electrode 32, and a spring 33. The measurement electrode 31 is attached to the insulating positioning member 4, and has the electrode face 3S. The signal extraction electrode 32 is fixed to the other end of the body 1 with the lid 12, and extracts a signal from the measurement electrode 31. The spring 33 is a flexible connection member for electrically connecting the measurement electrode 31 and the signal extraction electrode 32.

The measurement electrode 31 is substantially reverse T-shaped in the enlarged vertical section in FIG. 2, and includes an opposite portion 3A that is substantially disk-shaped and a penetration 3B that is column-shaped. The opposite portion 3A has the electrode face 3S having a shape of a circle and opposed to and a predetermined gap apart from the diaphragm 2. The penetration 3B projects from the center of the opposite portion 3A toward an insulating seal 6, penetrating the insulating positioning member 4. In a fixing screw mechanism, a threaded portion 3C is formed in the central area of the outer peripheral surface of the penetration 3B, and by screwing a nut 3D onto the threaded portion 3C, the insulating positioning member 4 is held with the nut 3D and the top of the opposite portion 3A. That is, the measurement electrode 31 and the insulating positioning member 4 are joined together. Thus, only the force from the insulating positioning member 4 substantially determines the position of the measurement electrode 31 in the body 1.

The signal extraction electrode 32 extracts to the outside a signal representing a voltage value to show that the capacitance between the diaphragm 2 and the electrode face 3S has changed with a change in the gap therebetween. As FIGS. 1 and 2 illustrate, the signal extraction electrode 32 is covered with a shielding cap 7 that is hollow cylindrical and made of metal. The insulating seal 6 is provided between the signal extraction electrode 32 and the shielding cap 7 so that the signal extraction electrode 32 is fixed. One end of the signal extraction electrode 32 is inside the insulating seal 6, and the other end is exposed to the outside of the body 1. Moreover, an accommodating depressed portion 3E that is substantially column-shaped and accommodates the spring 33 is formed at the one end of the signal extraction electrode 32. In a state where the components are assembled, an insertion 3F that is an end portion of the penetration 3B is inserted into the accommodating depressed portion 3E.

The natural length of the spring 33 is more than the distance between the insertion 3F and the bottom of the accommodating depressed portion 3E. As FIG. 2 illustrates, the spring 33 is pre-shrunk and provided between the insertion 3F and the bottom of the accommodating depressed portion 3E. The spring 33 is unfixed between the bottom of the accommodating depressed portion 3E and the end face of the insertion 3F, and keeps contact with the bottom and the end face by stretching. As is clear from FIG. 2, the spring 33 is surrounded mostly by a metal, and there is only a little space between the outer peripheral surface of the insertion 3F and the inner peripheral surface of the upper portion of the accommodating depressed portion 3E. That is, an electrostatic shielding structure is formed to prevent electromagnetic noise in the air from entering the spring 33 in the accommodating depressed portion 3E.

The following describes in detail a support structure SP for preventing the gap between the electrode face 3S and the diaphragm 2 from changing even if there have been changes in temperature in the insulating positioning member 4 and the capacitive pressure sensor 100.

As FIG. 2 illustrates, the insulating positioning member 4 is a disk-shaped component made of a glass or ceramic and having in the center a hole through which the penetration 3B passes. The edges of the top of the insulating positioning member 4 are cut at an angle of 45 degrees to insert a position adjustor 5A described later, and a flat surface 41 is at the end of the insulating positioning member 4 on the side where the diaphragm 2 is formed. The insulating positioning member 4 is supported by a support part 11 projecting toward the inside of the body 1 so that the flat surface 41 substantially matches a support plane PL a predetermined distance apart from the diaphragm 2 toward the other end of the body 1. As is clear from FIG. 2, the insulating positioning member 4 is not provided between the diaphragm 2 and the support plane PL, which matches the top of the support part 11. Moreover, as FIG. 2 illustrates, the dimension in the axial direction of the support part 11 is substantially the same as that of the opposite portion 3A. Here, the axial direction is the direction vertical to the diaphragm 2 receiving balanced pressure on the top and bottom and being a thin plate. That is, when the direction in which the diaphragm 2 is formed is viewed from the support plane PL, which matches the top of the support part 11, only a portion of the electrode member 3 projects toward the diaphragm 2.

With the support structure SP for supporting the insulating positioning member 4, even if a change in temperature thermally deforms the body 1, there is little change in the gap between the diaphragm 2 and the electrode face 3S. The following describes why that is so.

In the design, the distance in the axial direction from the diaphragm 2 to the support plane PL, which matches the top of the support part 11, is $L_1$. However, if the distance from the diaphragm 2 to the top of the support part 11 has become $L_1+\Delta L_1$ due to the thermal expansion of the body 1 caused by an increase in temperature in the body 1, the flat surface 41 moves upward by $\Delta L_1$ from the support plane PL. If there were no thermal expansion in the support portion 3A, the gap would increase by $\Delta L_1$. In reality, however, the opposite portion 3A thermally expands since the opposite portion 3A is made of metal in the present embodiment. Thus, if the dimension in the axial direction of the opposite portion 3A is $L_2$ in the design, the dimension after the thermal expansion is $L_2+\Delta L_2$. Therefore, if the value of the gap in the design is $G_D$ and the value of the gap after the thermal expansion of the body 1 is $G_T$, $G_D=L_1-L_2$, and $G_T=(L_1+\Delta L_1)-(L_2+\Delta L_2)$. Based on these expressions, the value of the gap after the thermal deformation of the body 1 is $G_D=G_T+(\Delta L_1-\Delta L_2)$. Here, $L_1$ and $L_2$ are substantially equal since the gap is set to a very small value that is around several tens of micron, to measure the capacitance. $\Delta L_1-\Delta L_2\approx 0$ is made possible by forming the body 1 and electrode member 3 with metals having similar values of the coefficients of liner expansion. Thus, $G_D\approx G_T$. It should be noted that similar explanation is applicable to the thermal shrinkage of the body 1.

In the support structure SP, only the body 1 and the opposite portion 3A, which are made of metal, are between the diaphragm 2 and the support plane, which matches the top of the support part 11, and there are no components having significantly different coefficients of linear expansion therebetween. Accordingly, the gap can be always kept constant irrespective of a change in temperature.

The following describes the pressing mechanism 5.

As FIG. 2 illustrates, the pressing mechanism 5 includes a position adjuster 5A and a pressing plate 53. The position adjuster 5A includes two components that have shapes of substantially C-shaped rings and serve as wedges to be fitted to the edges of the top of the insulating positioning member 4. The pressing plate 53 presses the top of the position adjuster 5A toward the diaphragm 2. Here, the pressing plate 53 covers the tops of the components of the position adjuster 5A. The pressing plate 53 is screwed to the body 1 with a fixing screw SC in the axial direction. When the fixing screw SC is tightened, the position adjuster 5A is pressed toward the diaphragm 2 via intercalations 5T.

Figure 3:
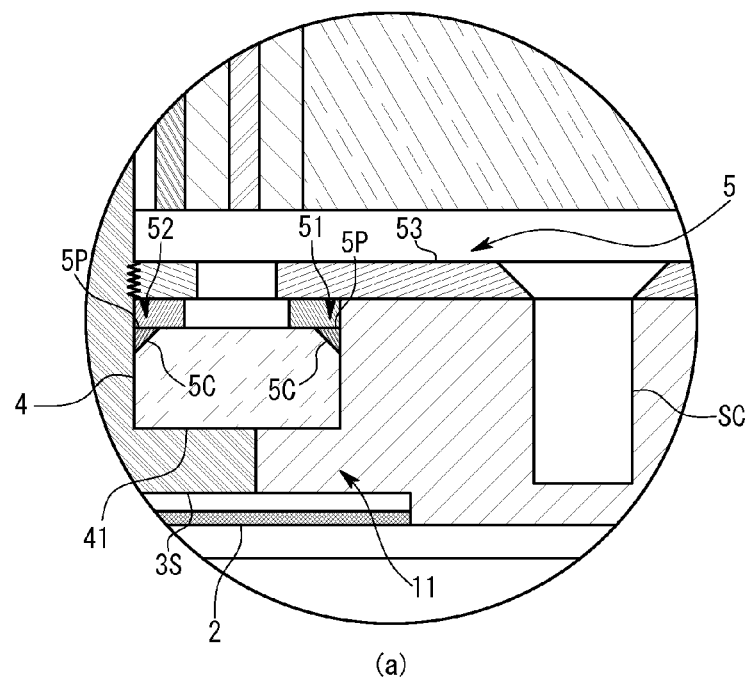
FIG. 3 schematically illustrates an enlarged cross section of a pressing mechanism for pressing an insulating positioning member and its vicinity in the embodiment.
Figure 3:
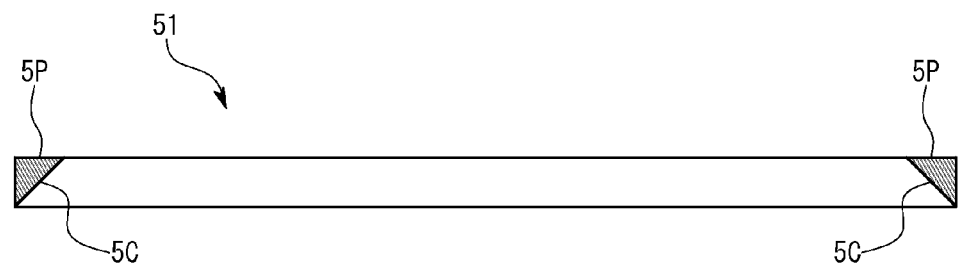
Figure 3:
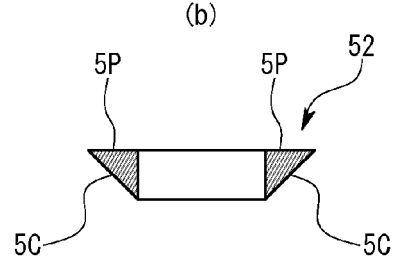
Figure 4:
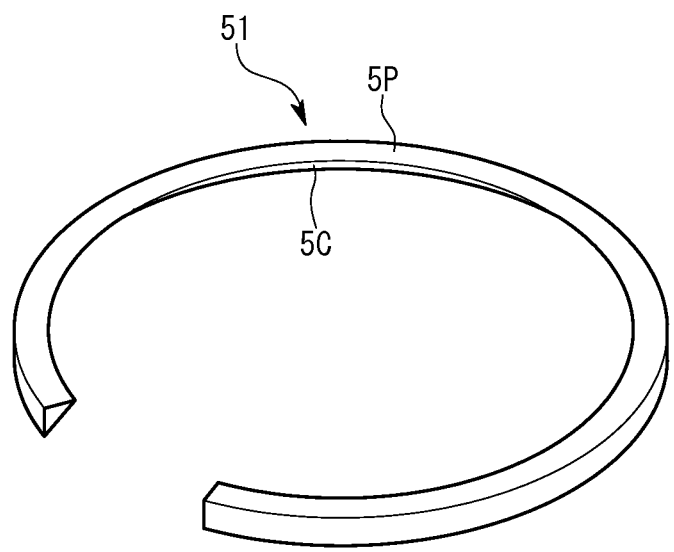
FIG. 4 is a schematic perspective view of a position adjustor in the embodiment.
Figure 4:
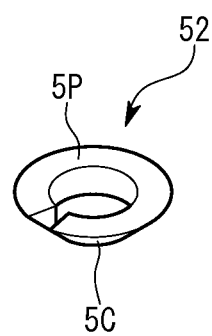

The position adjuster 5A includes a first ring-shaped component 51 and a second ring-shaped component 52. The first ring-shaped component 51 is fitted to the outer peripheral edge of the top of the insulating positioning member 4. The second ring-shaped component 52 is fitted to the inner peripheral edge of the top of the insulating positioning member 4. As FIGS. 2 and 3 illustrate, the tops of the first ring-shaped component 51 and the second ring-shaped component 52 are pressed surfaces 5P to be pressed by the force in the axial direction of the pressing plate 53. Moreover, as illustrated in the vertical sections in (b) and (c) in FIG. 3, and in the perspective views in (a) and (b) in FIG. 4, the inner side surface of the first ring-shaped component 51 and the outer side surface of the second ring-shaped component 52 are contact surfaces 5C that are in contact with the insulating positioning member 4 and with which the insulating positioning member 4 is to be obliquely pressed. The outer side surface of the first ring-shaped component 51 is in contact with the body 1. The inner side surface of the second ring-shaped component 52 is in contact with the outer peripheral surface of the penetration 3B. That is, when the pressing plate 53 presses the first ring-shaped component 51 and the second ring-shaped component 52 toward the diaphragm 2, they bite into the insulating positioning member 4 toward the diaphragm 2, acting like wedges. Thus, the force is resolved at the contact surfaces 5C, and the insulating positioning member 4 is pressed in the axial direction and in the radial direction at the same time. Here, the radial direction is the direction parallel to the diaphragm 2 receiving balanced pressure on the top and bottom and being a thin plate. In other words, the first ring-shaped component 51 and the second ring-shaped component 52 are wedge-like components having shapes of substantially C-shaped rings, i.e., having cutout portions. Thus, both the extents of the first ring-shaped component 51 and the second ring-shaped component 52 and the amounts of biting change, depending on the amount of pressing of the pressing plate 53. The insulating positioning member 4 is pressed in the axial direction and in the radial direction.

The pressing mechanism 5 having such a structure keeps the state where the centers of the electrode face 3S and the diaphragm 2 match the central axis CN. The following describes this effect.

As FIG. 2 and (a) in FIG. 3 illustrate, the insulating positioning member 4 is held with the contact surface 5C of the first ring-shaped component 51 and the contact surface 5C of the second ring-shaped component 52 in the radial direction, i.e., the direction parallel to the diaphragm 2. Forces in the opposite directions are applied from the contact surfaces 5C. If the insulating positioning member 4 moves in the right direction in the figures, the insulating positioning member 4 abuts only on the first ring-shaped component 51. The first ring-shaped component 51 then pushes back the insulating positioning member 4 toward the second ring-shaped component 52. The insulating positioning member 4 moves to the position where the center of the insulating positioning member 4 matches the central axis CN. At the position, the forces from the first ring-shaped component 51 and the second ring-shaped component 52 are balanced. Moreover, if the insulating positioning member 4 moves in the left direction in the figures, the pressing mechanism 5 pushes back the insulating positioning member 4 to the original position in the same manner. Accordingly, the pressing mechanism 5 keeps the center of the insulating positioning member 4 at the central axis. Thus, the electrode face 3S and the measurement electrode 31 fixed to the insulating positioning member 4 are also kept at the same positions in the radial direction.

In the capacitive pressure sensor 100 according to the present embodiment, the support structure SP for supporting the insulating positioning member 4 and the measurement electrode 31, which are accommodated in the body 1, makes it possible that even if a change in temperature thermally deforms the body 1, there is little change in the gap between the diaphragm 2 and the electrode face 3S. Accordingly, the measurement value of pressure is hardly affected by a change in temperature.

Moreover, the pressing mechanism 5 can prevent the electrode face 3S from deviating from the original position in the direction parallel to the diaphragm 2, and keep the centers of the diaphragm 2 and the electrode face 3S at the central axis CN. Thus, the electrode face 3S is almost always opposed to the central area that deforms due to a change in pressure more significantly than the other areas of the diaphragm 2. This prevents the electrode face 3S from detecting changes in capacitance caused by factors other than pressure.

Furthermore, the electrode member 3 is separated into the measurement electrode 31 and the signal extraction electrode 32, and the measurement electrode 31 can freely move. Thus, the effects of the support structure SP and the pressing mechanism 5 are not hindered, that is, the above effects are more easily obtained.

In addition, the spring 33 for connecting the measurement electrode 31 and the signal extraction electrode 32 is accommodated in the accommodating depressed portion 3E, and almost electrostatically shielded. Thus, the signal-to-noise ratio of measured pressure can be prevented from decreasing due to the superimposition of electromagnetic noise on a signal obtained in the electrode face 3S.

Accordingly, the capacitive pressure sensor 100 in the present embodiment can measure pressure with very high accuracy.

It should be noted that since the bottom of the insulating positioning member 4 is formed as the flat surface 41, the bottom has high accuracy of, for example, flatness. The opposite portion 3A of the measurement electrode 31 is attached to the flat surface 41, thereby making it easier to achieve high parallelism between the electrode face 3S and the diaphragm 2, and high measurement accuracy of pressure.

Moreover, since screw fixing is employed as a way to fix the measurement electrode 31 to the insulating positioning member 4, the assembling is easily simplified while maintaining the accuracy of the assembling.

The following describes other embodiments. It should be noted that identical reference signs are used to designate components corresponding to the components in the above embodiment.

Figure 5:
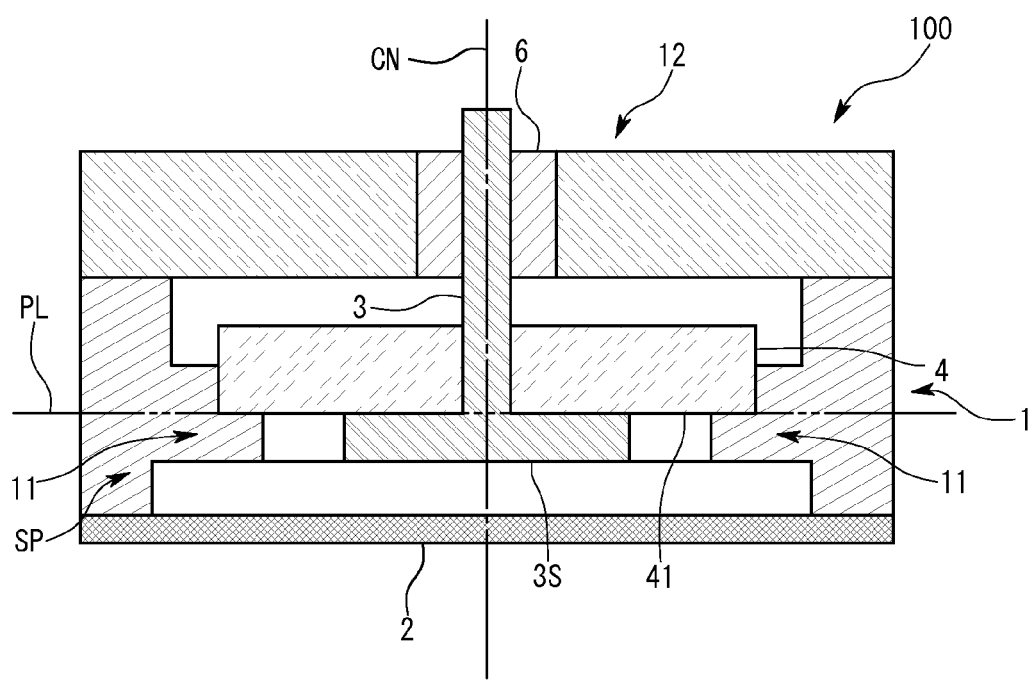
FIG. 5 schematically illustrates a cross section of a capacitive pressure sensor according to an embodiment of the present invention.

Although the electrode member 3 is separated into the measurement electrode 31 and the signal extraction electrode 32 in the above embodiment, the measurement electrode 31 and the signal extraction electrode 32 may be integrated as FIG. 5 illustrates. Even a capacitive pressure sensor as FIG. 5 illustrates has the support structure SP similar to that in the above embodiment. Thus, even if there has been an increase in temperature, the gap between the diaphragm 2 and the electrode face 3S can be kept almost constant. Thus, the measurement value of pressure is robust to a change in temperature.

Figure 6:
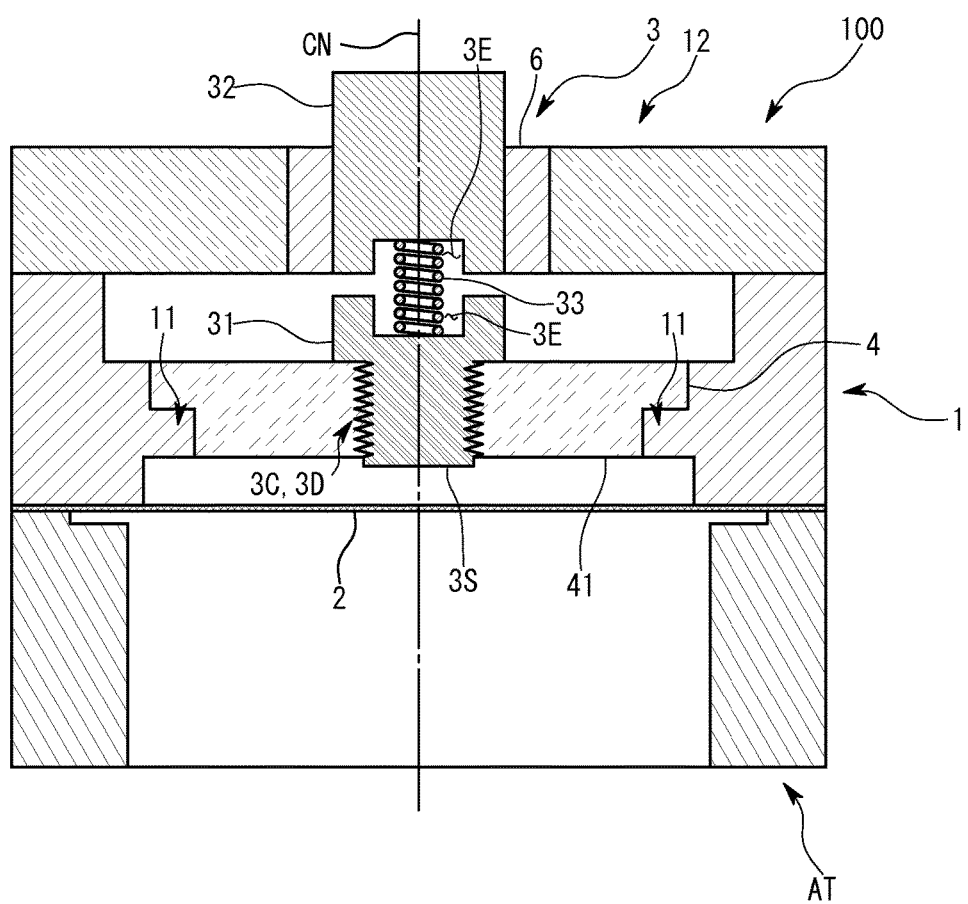
FIG. 6 schematically illustrates a cross section of a capacitive pressure sensor according to an embodiment of the present invention.

Furthermore, as FIG. 6 illustrates, the accommodating depressed portion 3E may extend over the signal extraction electrode 32 and the measurement electrode 31, and the spring 33 may be provided in the accommodating depressed portion 3E as the flexible connection member. Here, the flexible connection member may be completely accommodated in the accommodating depressed portion 3, or at least a portion of the flexible connection member may be accommodated and the other portion may be exposed to the outside. In addition, the flexible connection member need not necessarily be the spring 33, but may be, for example, a conductive string or lead. That is, a flexible connection member is appropriate as long as it can maintain electrical connection and has substantially little effect on the measurement electrode 31 and the signal extraction electrode 32. Moreover, the fixing screw mechanism may also function as the nut 3D that is screwed onto the threaded portion 3C formed in the penetration 3B penetrating the insulating positioning member 4.

Figure 7:
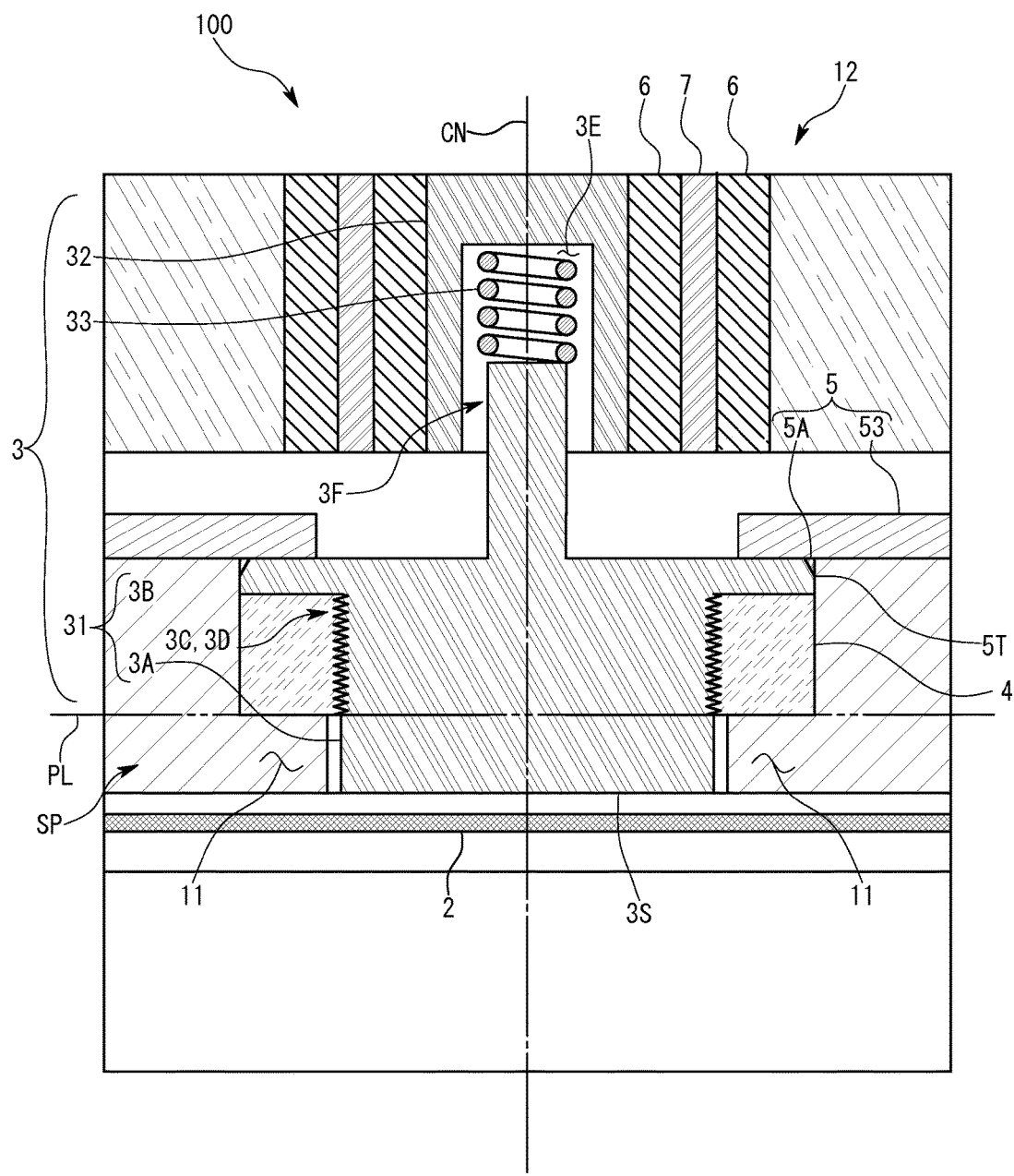
FIG. 7 schematically illustrates a cross section of a capacitive pressure sensor according to an embodiment of the present invention.

As the pressing structure 5 in FIG. 7 illustrates, to automatically adjust the position of the electrode face 3S in the direction parallel to the diaphragm 2, a portion of the electrode member 3 may be held and pressed in the direction parallel to the diaphragm 2. More specifically, the position adjuster 5A is a ring-shaped component, and fits into the almost entire circumference of a portion of the measurement electrode 31 of the electrode member 3. The position adjustment may be performed by pressing the top of the position adjuster 5A with the pressing plate 53, so that the electrode member 3 is held and pressed in the radial direction with the contact surface 5C obliquely formed.

Figure 8:
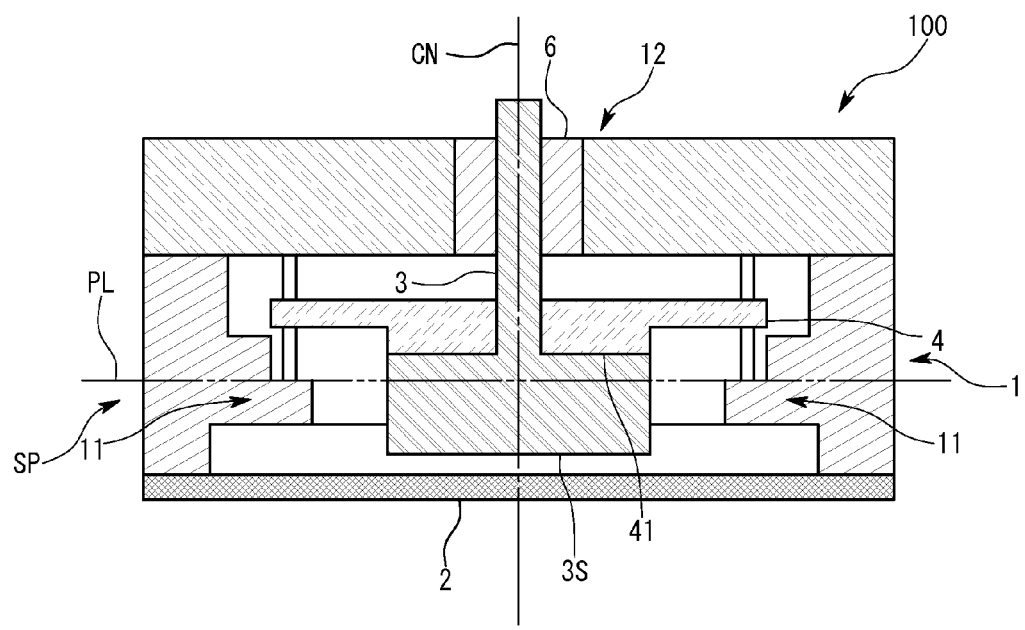
FIG. 8 schematically illustrates a cross section of a capacitive pressure sensor according to an embodiment of the present invention.
Figure 9:
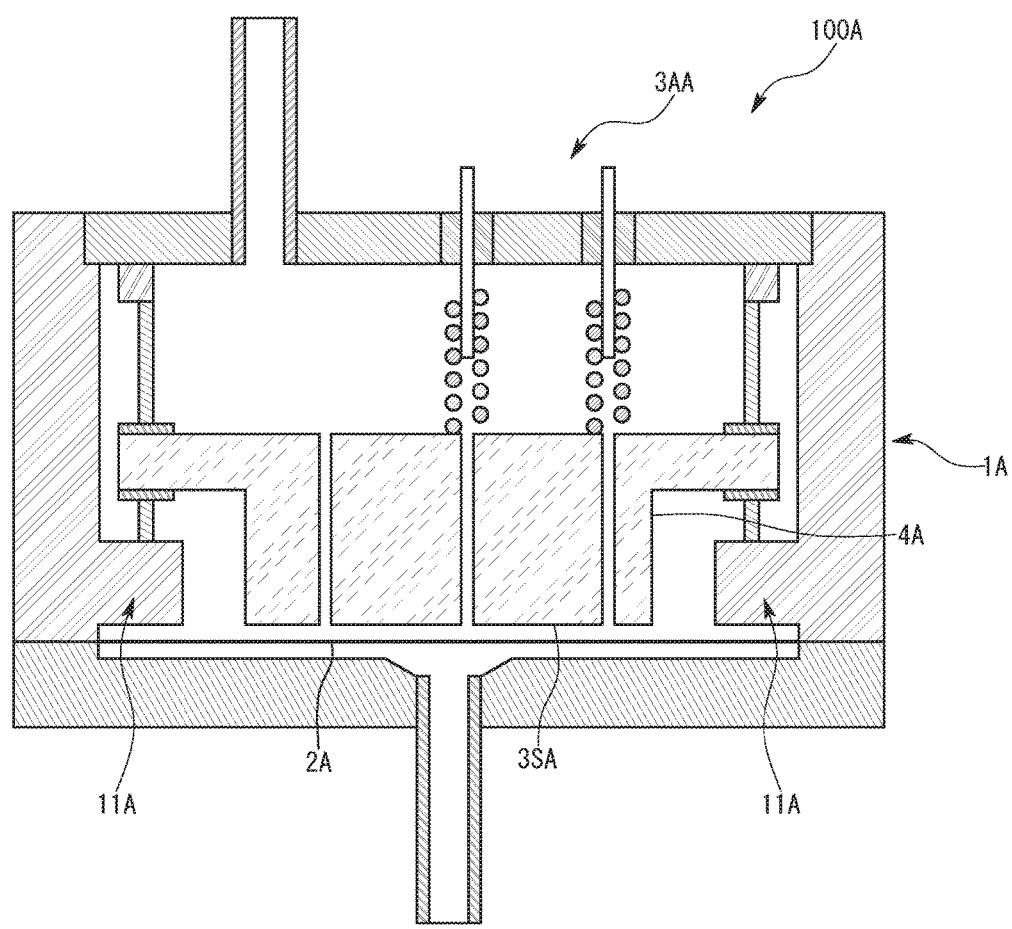
FIG. 9 schematically illustrates a cross section of a conventional capacitive pressure sensor.

Furthermore, as the support structure SP in FIG. 8 illustrates, the insulating positioning member 4 may be provided only between the support plane PL of the support part 11 and the other end of the body 1. More specifically, the flat surface 41, which is the end of the insulating positioning member on the side where the diaphragm 2 is formed, is apart from the support plane PL toward the lid 12. A portion of the electrode member 3 may project from the flat surface 41 toward the diaphragm 2, crossing the support plane PL. Even in this support structure SP, in the same manner as the above embodiments, the gap between the electrode face 3S and the diaphragm can be prevented from changing due to a change in temperature by matching a thermal deformation volume in the body 1 between the diaphragm 2 and the support plane PL with a thermal deformation volume in the electrode member 3 between the diaphragm 2 and the support plane PL. It should be noted that the degree of projection representing a length from the insulating positioning member 4 to the electrode face 3S of the measurement electrode 31 may be appropriately set according to the set gap. Moreover, the gap becomes more robust to a change in temperature by making the electrode face 3S approach the diaphragm 2 as closely as possible without interfering the diaphragm 2.

The pressing mechanisms need not necessarily be the ones described in the embodiments. For instance, the contact surface may be a curved surface rather than an inclined face so that the contact surface has line contact or point contact with the cross-section of the insulating positioning member. Moreover, the position adjuster may have only the first ring-shaped component. That is, the pressing mechanism is appropriate as long as it holds the insulating positioning member in the radial direction and forces are applied in opposite directions from opposite points. Furthermore, although the ring-shaped component has a shape of a C-shaped ring in the above embodiments, it may have a shape of a complete ring. The edges of the insulating positing part need not necessarily be inclined at 45 degrees but may be inclined at other angles, and the distribution of forces in the axial direction and in the radial direction may be appropriately adjusted.

The embodiments may be variously modified or combined without departing from the scope of the present invention.

INDUSTRIAL APPLICABILITY

The present invention provides a capacitive pressure sensor that prevents capacitance from changing due to factors other than pressure by keeping an electrode face opposed to a diaphragm at almost the same position in the direction parallel to the diaphragm, and thus accurately measures pressure based on a change in the capacitance.

The invention claimed is:

1. A capacitive pressure sensor comprising:
    a diaphragm that deforms under pressure;
    an electrode having an electrode face opposed to the diaphragm with a gap between the diaphragm and the electrode face;
    a body having one end to which the diaphragm is joined, and accommodating at least a portion of the electrode;
    an insulating positioning member that is provided in the body, and that positions at least the portion of the electrode accommodated in the body; and
    a pressing mechanism that is configured to hold and press the insulating positioning member or the electrode in a direction parallel to the diaphragm,
    wherein the pressing mechanism includes a position adjuster that includes a contact surface that is in contact with the insulating positioning member, the position adjuster configured to press the insulating positioning member in a direction oblique to the diaphragm and
    the position adjuster includes a cutout portion comprising a recess that extends transverse to the contact surface and through the position adjustor.

2. The capacitive pressure sensor according to claim 1,
    wherein the position adjuster has a pressed surface to which a force is to be applied in a direction transverse to the diaphragm.

3. The capacitive pressure sensor according to claim 2,
    wherein the contact surface is an inclined face inclined relative to the pressed surface.

4. The capacitive pressure sensor according to claim 2,
    wherein the position adjuster is substantially ring-shaped, and has a top surface that is the pressed surface and an inner peripheral surface that is the contact surface.

5. The capacitive pressure sensor according to claim 2,
    wherein the pressing mechanism further includes a pressing plate that is in contact with the pressed surface and screwed to the body in the direction transverse to the diaphragm.

6. The capacitive pressure sensor according to claim 1,
    wherein the electrode includes:
    a fixed electrode fixed to the insulating positioning member, and having the electrode face;
    a signal extraction electrode fixed with an insulating seal sealing the other end of the body; and a flexible connector that electrically connects the fixed electrode and the signal extraction electrode.

7. A capacitive pressure sensor comprising:

a diaphragm that deforms under pressure;

an electrode having an electrode face opposed to the diaphragm with a gap between the diaphragm and the electrode face;

a body having one end to which the diaphragm is joined, and accommodating at least a portion of the electrode;

an insulating positioning member that is provided in the body, and that positions at least the portion of the electrode accommodated in the body; and a pressing mechanism that is configured to hold and press the insulating positioning member or the electrode in a direction parallel to the diaphragm, wherein the pressing mechanism includes a position adjuster that includes a contact surface that is in contact with the insulating positioning member, the position adjuster configured to press the insulating positioning member in a direction oblique to the diaphragm and the position adjuster includes a cutout portion comprising a cutout that extends transverse to the contact surface and through the position adjustor.

8. The capacitive pressure sensor according to claim 7, wherein the position adjuster has a pressed surface to which a force is to be applied in a direction transverse to the diaphragm.

9. The capacitive pressure sensor according to claim 8, wherein the contact surface is an inclined face inclined relative to the pressed surface.

10. The capacitive pressure sensor according to claim 8, wherein the position adjuster is substantially ring-shaped, and has a top surface that is the pressed surface and an inner peripheral surface that is the contact surface.

11. The capacitive pressure sensor according to claim 8, wherein the pressing mechanism further includes a pressing plate that is in contact with the pressed surface and screwed to the body in the direction transverse to the diaphragm.

12. The capacitive pressure sensor according to claim 7, wherein the electrode includes:

a fixed electrode fixed to the insulating positioning member, and having the electrode face;

a signal extraction electrode fixed with an insulating seal sealing the other end of the body; and a flexible connector that electrically connects the fixed electrode and the signal extraction electrode.

* * * * *